United States Patent [19]

Synosky et al.

[11] Patent Number: 5,437,875

[45] Date of Patent: Aug. 1, 1995

[54] WAX-FREE LOW MOISTURE CHEWING GUM

[75] Inventors: Steven P. Synosky, Greenbrook, N.J.; Gordon N. McGrew, Evanston; Philip G. Schnell, Downers Grove, both of Ill.

[73] Assignee: Wm. Wrigley, Jr. Company, Chicago, Ill.

[21] Appl. No.: 295,661

[22] PCT Filed: Mar. 2, 1993

Related U.S. Application Data

[63] Continuation-in-part of PCT/US92/11317, Dec. 30, 1992, which is a continuation-in-part of PCT/US92/09615, Nov. 6, 1992, which is a continuation-in-part of PCT/US92/01686, Mar. 3, 1992.

[86] PCT No.: PCT/US93/01900

§ 371 Date: Aug. 24, 1994

§ 102(e) Date: Aug. 24, 1994

[87] PCT Pub. No.: WO93/17573

PCT Pub. Date: Sep. 16, 1993

[51] Int. Cl.⁶ ............................................. A23G 3/30
[52] U.S. Cl. ............................................. 426/3
[58] Field of Search ................................. 426/3–6

[56] References Cited

U.S. PATENT DOCUMENTS

| | | | |
|---|---|---|---|
| 1,534,929 | 4/1925 | Dunham | 426/3 |
| 1,534,930 | 4/1925 | Dunham | 426/3 |
| 1,534,931 | 4/1925 | Dunham | 426/3 |
| 1,807,704 | 6/1931 | Pappadis | 426/3 |
| 2,078,878 | 4/1937 | Jackman | 99/135 |
| 2,265,465 | 12/1941 | Wilson | 99/135 |
| 2,289,407 | 7/1942 | Hampton | 99/135 |
| 2,782,123 | 2/1957 | Rubin | 99/141 |
| 3,161,524 | 12/1964 | Opie et al. | 99/94 |
| 3,262,784 | 7/1966 | Bucher | 99/135 |
| 3,632,358 | 1/1972 | Echeandia et al. | 99/135 |
| 3,766,165 | 10/1973 | Rennhard | 260/209 R |
| 3,843,818 | 10/1974 | Wren et al. | 426/346 |
| 3,857,965 | 12/1974 | Ream | 426/3 |
| 3,894,146 | 7/1975 | Tsuyama | 424/49 |
| 3,974,032 | 8/1976 | Harjes et al. | 195/31 R |
| 3,984,574 | 10/1976 | Comollo | 426/4 |
| 3,995,064 | 11/1976 | Ehrgott et al. | 426/3 |
| 3,996,389 | 12/1976 | Osborne | 426/565 |
| 4,065,579 | 12/1977 | Mackay et al. | 426/3 |
| 4,139,639 | 2/1979 | Bahoshy et al. | 426/3 |
| 4,150,161 | 4/1979 | Rudolph et al. | 426/3 |
| 4,187,320 | 2/1980 | Koch et al. | 426/3 |
| 4,224,345 | 9/1980 | Tezuka et al. | 426/3 |
| 4,230,687 | 10/1980 | Sair et al. | 424/22 |
| 4,352,822 | 9/1982 | Cherukuri et al. | 426/4 |
| 4,352,823 | 10/1982 | Cherukuri et al. | 426/5 |
| 4,357,355 | 11/1982 | Koch et al. | 426/4 |
| 4,359,531 | 11/1982 | Bucke et al. | 435/97 |
| 4,382,963 | 5/1983 | Klose et al. | 426/3 |
| 4,384,004 | 5/1983 | Cea et al. | 426/3 |
| 4,386,106 | 5/1983 | Merritt et al. | 426/5 |
| 4,387,108 | 6/1983 | Koch et al. | 426/4 |
| 4,452,820 | 6/1984 | D'Amelia et al. | 426/3 |

(List continued on next page.)

FOREIGN PATENT DOCUMENTS 0067665 12/1982 European Pat. Off. ...... A23G 3/30

(List continued on next page.)

OTHER PUBLICATIONS

"Fructooligosaccharides (FOS)—An All Natural, Versatile, Low-Calorie Bulking Agent", by Dr. Peter Perna, Coors Biotech, Inc. (date unknown).

(List continued on next page.)

Primary Examiner—Jeanette Hunter
Attorney, Agent, or Firm—Maxwell J. Petersen; Willian Brinks Hofer Gilson & Lione

[57] ABSTRACT

A wax-free, low moisture chewing gum is provided which is devoid or substantially free of wax. The chewing gum also contains less than 2.0 weight percent water and comprises a wax-free gum base which includes about 20 to about 60 weight percent synthetic elastomer, 0 to about 30 weight percent natural elastomer, about 5 to about 55 weight percent elastomer plasticizer, about 4 to about 40 weight percent filler, about 5 to about 40 weight percent softener, and optional minor amounts of miscellaneous ingredients such as colors, antioxidants, etc. Low moisture chewing gum compositions which contain the wax-free gum base are also provided.

45 Claims, No Drawings

U.S. PATENT DOCUMENTS

| | | | |
|---|---|---|---|
| 4,497,846 | 2/1985 | Boursier et al. | 426/660 |
| 4,514,422 | 4/1985 | Yang et al. | 426/3 |
| 4,515,769 | 5/1985 | Merritt et al. | 424/49 |
| 4,528,206 | 7/1985 | Kastin | 426/660 |
| 4,556,429 | 12/1985 | Takazoe et al. | 127/30 |
| 4,579,738 | 4/1986 | Cherukuri et al. | 426/3 |
| 4,581,234 | 4/1986 | Cherukuri et al. | 426/3 |
| 4,587,119 | 5/1986 | Bucke et al. | 424/48 |
| 4,587,125 | 5/1986 | Cherukuri et al. | 424/48 |
| 4,597,970 | 7/1986 | Sharma et al. | 426/5 |
| 4,604,287 | 8/1986 | Glass et al. | 426/5 |
| 4,634,593 | 1/1987 | Stroz et al. | 426/5 |
| 4,671,961 | 6/1987 | Patel et al. | 426/3 |
| 4,671,967 | 6/1987 | Patel et al. | 426/658 |
| 4,681,771 | 7/1987 | Adachi et al. | 426/658 |
| 4,683,138 | 7/1987 | Glass et al. | 426/5 |
| 4,695,326 | 9/1987 | Takazoe et al. | 127/30 |
| 4,728,515 | 3/1988 | Patel et al. | 426/3 |
| 4,737,366 | 4/1988 | Gergely et al. | 426/5 |
| 4,741,905 | 5/1988 | Huzinec | 426/3 |
| 4,765,991 | 8/1988 | Cherukuri et al. | 426/3 |
| 4,786,722 | 11/1988 | Zehner | 536/1.1 |
| 4,792,453 | 12/1988 | Reed et al. | 426/5 |
| 4,794,003 | 12/1988 | Cherukuri et al. | 426/6 |
| 4,802,924 | 2/1989 | Woznicki et al. | 427/3 |
| 4,804,544 | 2/1989 | Cherukuri et al. | 426/5 |
| 4,816,265 | 3/1989 | Cherukuri et al. | 426/5 |
| 4,872,884 | 10/1989 | Cherukuri et al. | 426/3 |
| 4,889,727 | 12/1989 | Dave et al. | 426/3 |
| 4,931,294 | 6/1990 | Yatka et al. | 426/3 |
| 4,933,188 | 6/1990 | Cherukuri et al. | 426/3 |
| 4,938,971 | 7/1990 | Chapdelaine et al. | 426/3 |
| 4,948,596 | 8/1990 | Bunick et al. | 426/3 |
| 4,954,353 | 9/1990 | Cherukuri et al. | 426/5 |
| 4,961,935 | 10/1990 | Cherukuri et al. | 426/3 |
| 4,971,787 | 11/1990 | Cherukuri et al. | 414/48 |
| 4,971,806 | 11/1990 | Cherukuri et al. | 426/5 |
| 4,975,287 | 12/1990 | Zibell et al. | 426/3 |
| 4,978,751 | 12/1990 | Biton et al. | 536/123 |
| 4,980,177 | 12/1990 | Cherukuri et al. | 426/3 |
| 4,983,405 | 1/1991 | Cherukuri et al. | 426/3 |
| 4,986,991 | 1/1991 | Yatka et al. | 426/3 |
| 5,009,900 | 4/1991 | Levine et al. | 426/96 |
| 5,023,093 | 6/1991 | Cherukuri et al. | 426/3 |
| 5,039,530 | 8/1991 | Yatka jet al. | 426/3 |
| 5,041,294 | 8/1991 | Patel | 426/3 |
| 5,059,429 | 10/1991 | Cherukuri et al. | 426/3 |
| 5,066,511 | 11/1991 | Cherukuri et al. | 426/658 |

(List continued on next page.)

FOREIGN PATENT DOCUMENTS

| | | | |
|---|---|---|---|
| 0082670 | 6/1983 | European Pat. Off. | A23G 3/30 |
| 0236271 | 9/1987 | European Pat. Off. | A61K 9/68 |
| 0252874 | 1/1988 | European Pat. Off. | A23G 3/30 |
| 0301628 | 2/1989 | European Pat. Off. | C12N 9/10 |
| 0325090 | 7/1989 | European Pat. Off. | A23G 3/30 |
| 0337889 | 10/1989 | European Pat. Off. | A23G 1/236 |
| 0351972 | 1/1990 | European Pat. Off. | A23G 3/30 |
| 0351973 | 1/1990 | European Pat. Off. | A23L 1/236 |
| 0368451 | 5/1990 | European Pat. Off. | C08B 30/18 |
| 0390438 | 10/1990 | European Pat. Off. | A23G 3/00 |
| 0397027 | 11/1990 | European Pat. Off. | A01N 43/08 |
| 0398465 | 11/1990 | European Pat. Off. | C08B 37/00 |
| 0421670 | 4/1991 | European Pat. Off. | A23G 3/30 |
| 0425115 | 5/1991 | European Pat. Off. | A23G 3/30 |
| 0438912 | 7/1991 | European Pat. Off. | A23L 1/308 |
| 0449594 | 10/1991 | European Pat. Off. | A23L 1/0526 |
| 0457098 | 11/1991 | European Pat. Off. | A23L 1/307 |
| 0472428 | 2/1992 | European Pat. Off. | A23G 3/30 |
| 0566174 | 10/1993 | European Pat. Off. | A23G 3/30 |
| 2626583 | 8/1989 | France | C12P 19/44 |
| 2115461 | 3/1971 | Germany | A23G 3/30 |
| 58-138355 | 8/1983 | Japan | A23L 1/236 |
| 60-224449 | 11/1985 | Japan | A23G 3/30 |
| 61-173748 | 6/1986 | Japan | A23G 3/30 |
| 62-146562 | 6/1987 | Japan | A23G 3/30 |
| 62-148496 | 7/1987 | Japan | C07H 15/4 |
| 1-19860 | 4/1989 | Japan | A23G 3/30 |
| 3-100695 | 4/1990 | Japan | C12P 19/14 |
| 3-154664 | 6/1990 | Japan | A23L 1/308 |
| 3-20301 | 1/1991 | Japan | C08B 37/00 |
| 3-47831 | 7/1991 | Japan | A23L 3/308 |
| 3-47832 | 7/1991 | Japan | A23L 1/308 |

(List continued on next page.)

OTHER PUBLICATIONS

"*Polymer Handbook*", Second Edition, by Bandrup & Immergut, John Wiley & Sons, Inc. (1975), pp. IV-337 to IV-375.

(List continued on next page.)

U.S. PATENT DOCUMENTS

| | | |
|---|---|---|
| 5,082,671 | 1/1992 | Cherukuri ............................... 426/3 |
| 5,085,872 | 2/1992 | Patel et al. ............................. 426/4 |
| 5,087,459 | 2/1992 | Chuu et al. ............................ 426/4 |
| 5,100,678 | 3/1992 | Reed et al. ............................ 426/3 |
| 5,120,550 | 6/1992 | Van der Schueren ................. 426/3 |
| 5,139,798 | 8/1992 | Yatka et al. ............................ 426/5 |
| 5,165,943 | 11/1992 | Patel et al. ............................. 426/3 |
| 5,165,944 | 11/1992 | Song et al. ............................. 426/5 |
| 5,167,972 | 12/1992 | Greenberg et al. ..................... 426/3 |
| 5,169,657 | 12/1992 | Yatka et al. ............................ 426/5 |
| 5,169,658 | 12/1992 | Yatka et al. ............................ 426/5 |
| 5,171,589 | 12/1992 | Richey et al. .......................... 426/5 |
| 5,178,889 | 1/1993 | Reed et al. ............................ 426/3 |
| 5,192,562 | 3/1993 | Grey et al. ............................. 426/4 |

FOREIGN PATENT DOCUMENTS

| | | | |
|---|---|---|---|
| 347376 | 4/1931 | United Kingdom . | |
| 378073 | 8/1932 | United Kingdom | A23G 3/30 |
| 2063268 | 11/1979 | United Kingdom | C13K 13/00 |
| 2066639 | 11/1979 | United Kingdom | A23L 1/236 |
| 84-01693 | 5/1984 | WIPO | A23G 3/30 |
| 89-03170 | 4/1989 | WIPO . | |
| 90-06061 | 6/1990 | WIPO | A23G 3/30 |
| 90-06317 | 6/1990 | WIPO | C07H 15/04 |
| 90-07859 | 7/1990 | WIPO . | |
| 90-07864 | 7/1990 | WIPO . | |
| 91-03147 | 3/1991 | WIPO . | |
| 92-10943 | 7/1992 | WIPO | A23G 3/30 |

OTHER PUBLICATIONS

Raftilose, "Oligofructose", by Raffinerie Tirlemontoise S.A. and Tiense Suikerraffinaderij N.V.

"Soluble & Insoluble Bulking Agents, Prospects & Applications", by Smits and Norman, presented by IBC Bulking Agents COnference (Mar. 13, 1991).

"Textbook Of Polymer Science", Second Edition, by Billmeyer, Jr., John Wiley & Sons, Inc. (1971), pp. 23–61.

L. A. Dreyfus Company—List Of Known Gum Base Compositions, 7 pages, Aug. 25, 1994.

1

WAX-FREE LOW MOISTURE CHEWING GUM

RELATED APPLICATIONS

This application is a continuation-in-part of a copending International Application No. PCT/US92/11317, filed on Dec. 30, 1992 which in turn is a continuation-in-part of International Application No. PCT/US92/09615, filed on Nov. 6, 1992, which in turn is a continuation-in-part of PCT/US92/01686, filed on Mar. 3, 1992. Each of the above applications are incorporated herein by reference.

FIELD OF THE INVENTION

The present invention relates to improved low moisture chewing gums of the type which do not contain petroleum wax or mineral wax.

BACKGROUND OF THE INVENTION

U.S. Pat. No. 3,984,574, issued to Comollo, discloses an adhesive chewing gum base in which the non-tack properties were achieved by eliminating conventional chewing gum base ingredients which were found to contribute to chewing gum tackiness, and by substituting non-tacky ingredients in place of the conventional ingredients. Specifically, it was discovered that three classes of materials account for conventional chewing gum tackiness. These materials are elastomers, resins, and waxes.

Comollo eliminated natural and some synthetic elastomers from chewing gum base, and substituted in their place one or more non-tacky synthetic elastomers such as polyisobutylene, polyisoprene, isobutyleneisoprene copolymer and butadiene-styrene copolymer. Comollo also eliminated the tack-producing natural resins and modified natural resins and used instead relatively high amounts of hydrogenated or partially hydrogenated vegetable oils or animal fats. Finally, Comollo completely excluded waxes from the gum base, but included polyvinyl acetate, fatty acids, and mono and diglycerides of fatty acids.

SUMMARY OF THE INVENTION

The present invention is directed to waxfree, low moisture chewing gums manufactured using waxfree gum bases and other essentially dried ingredients wherein the total amount of moisture contained in the final chewing gum product ranges from about 0.1 weight percent to about 2.0 weight percent water. The term "essentially dried" as used herein means less than 10 weight percent water and is used to describe ingredients which are anhydrous as well as ingredients containing as much as 10.0 weight percent water. These essentially dried, i.e. from 0–10% water, materials may be, for example dextrose or sucrose solid crystalline compounds or corn syrup solids, other types of sweeteners or sweetener solids, or such formulated products such as coevaporated Lycasin, a product to be described later. Generally speaking, our wax-free low moisture gums are made using a wax-free gum base, bulking agents, binders and sweeteners (all herein referred to generally as sweeteners) where the bulking agents are the usual crystalline or powdered sugars, sugar alcohols, and the like, and the binders are low moisture modified syrups such as those described in U.S. Pat. No. 4,728,515, Patel et. al., and U.S. Pat. No. 4,671,861, Patel et. al., both of which are incorporated herein by reference.

The modified low moisture syrups can be made by adding water-soluble plasticizers, i.e., glycerin, propylene glycol, or mixtures thereof, to carbohydrate syrups, which syrups preferably contain carbohydrate solids and water with less than 30 weight percent of the carbohydrate solids having a degree of polymerization (DP) of one, and more than 20 weight percent carbohydrate solids having a DP greater than 4. Normally the syrups initially contain at least 50 weight percent total carbohydrate solids.

After the addition of the water-soluble plasticizers to the carbohydrate syrups, the mixture is heated to temperatures sufficient to remove water from the mixture, preferably such that the total amount of water remaining in the plasticized carbohydrate syrup is less than 20 weight percent, and preferably less than 10 weight percent, of the total plasticized carbohydrate syrup.

The gum base of the invention includes quantities of at least one each of an elastomer, elastomer plasticiser, filler and softener, and, like the gum base of Comollo, is substantially free of petroleum, mineral, and, in most cases, natural waxes. However, the gum base of the invention is not limited to use in a non-tack chewing gum and may, therefore, contain, if selected, quantities of natural elastomer and/or natural resins, certain plasticizers, emulsifying agents and softeners. The gum base of the invention may also contain optional quantities of minor ingredients such as color, hygroscopic agents and antioxidant.

The use of natural elastomers in the gum base compliments certain chewing gum flavors, such as mint oil, by rounding out the otherwise harsh or grassy notes in the flavor. The presence of natural elastomers and natural resins in the gum base also contributes to improved chewing gum texture and flavor retention. There is currently a need or desire in the chewing gum industry for gum bases which are devoid or substantially free of hydrocarbon-containing waxes and which contain desired quantities of natural elastomers, natural resins, or both.

We have found that, by removing petroleum and mineral wax from the normal chewing gums having moisture contents in excess of 2.5–3.0 weight percent, sometimes as high as about 3.0 to 8.0 weight percent or higher, that these high moisture wax-free gums tend to dry out and become brittle with time. The storage stability of such a wax-free gum in something less than desirable when the wax-free gum contains at least 2.5 weight percent water (moisture), particularly from 3.0 to 8.0 weight percent water, or higher. The chewing gums, with this poor stability, lose flexibility, become hard, and are brittle.

With the foregoing in mind, it is a feature and advantage of the invention to provide a substantially wax-free low moisture chewing gum having improved storage stability.

It is also a feature and advantage of the invention to provide a suitably soft chewing gum with low moisture in which wax is not needed to soften the chewing gum.

It is also a feature and advantage of the invention to provide improved chewing gums which contain wax-free chewing gum ingredients having low moisture content, which gums retain flexibility and provide a good soft initial chew.

It is also a feature and advantage of the invention to provide improved wax-free, low moisture chewing gums that hydrate better during about one to three minutes of chewing.

It is also a feature and advantage of the invention to provide wax-free, low moisture chewing gum products having desirable properties such as flavor quality and strength, flavor and sweetness retention, breath freshening, dental and oral health properties and good shelf stability.

The foregoing and other features and advantages will become further apparent from the following detailed description of the presently preferred embodiments, when read in conjunction with the accompanying examples. It should be understood that the detailed description and examples are illustrative rather than limitative, the scope of the present invention being defined by the appended claims and equivalents thereof.

DETAILED DESCRIPTION OF THE PRESENTLY PREFERRED EMBODIMENTS

In accordance with the invention, a wax-free chewing gum base is provided for use in either non-tack or conventional low moisture chewing gum, which may be either bubble gum or regular chewing gum. The wax-free chewing gum base of the invention contains about 20 to about 60 weight percent synthetic elastomer, 0 to about 30 weight percent natural elastomer, about 5 to about 55 weight percent elastomer plasticizer, about 4 to about 40 weight percent filler, about 5 to about 40 weight percent fats, oils, and softeners, and optional minor amounts (about one percent or less) of miscellaneous ingredients such as colorants, emulsifiers, antioxidants, hygroscopic agents, etc.

Synthetic elastomers may include, but are not limited to, polyisobutylene (PIB) with GPC molecular weight of about 10,000 to about 95,000, isobutyleneisoprene copolymer (butyl rubber, or butyl elastomer), styrene-butadiene copolymers having styrene-butadiene ratios of about 1:3 to about 3:1 (SBR), polyvinyl acetate (PVA) having GPC molecular weight of about 2,000 to about 90,000, polyisoprene (PIP), polyethylene (PE), vinyl acetate-vinyl laurate copolymer having vinyl laurate content of about 5 to about 50 percent by weight of the copolymer, and combinations thereof.

Preferred ranges are, for polyisobutylene, 50,000 to 80,000 GPC molecular weight, for styrenebutadiene, 1:1 to 1:3 bound styrene-butadiene, for polyvinyl acetate, 10,000 to 65,000 GPC molecular weight with the higher molecular weight polyvinyl acetates typically used in bubble gum base, and for vinyl acetate-vinyl laurate, vinyl laurate content of 10–45 percent.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, chiquibul, crown gum, pendare, venezuelau chicle, leche de vaca, niger gutta, tunu, chilte and combinations thereof. The preferred natural elastomers are jelutong, chicle, sorva and massaranduba balata. The preferred elastomers and elastomer concentrations vary depending on whether the chewing gum in which the base is used is adhesive or conventional, bubble gum or regular gum, as discussed below.

Elastomer plasticizers may include, but are not limited to, natural rosin esters such as glycerol esters of partially hydrogenated rosin, glycerol esters of polymerized rosin, glycerol esters of partially dimerized rosin, glycerol esters of rosin, glycerol ester of tall oil rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or di limonene; natural terpene resin; and any suitable combinations of the foregoing. The preferred elastomer plasticizers will also vary depending on the specific application, and on the type of elastomer which is used. For example, use of terpene resin to wholly or partially replace ester gums will cause the gum base to be less tacky.

The term "wax-free" as used herein refers to the exclusion of waxes which contain mineral hydrocarbons. Natural waxes such as carnauba wax, beeswax, rice bran wax, and candellila wax do not contain mineral hydrocarbons and are therefor acceptable for use in the chewing gum base and chewing gums prepared therefrom. However, even the natural waxes are optional ingredients, and are used within the range of between about 0.0 to about 5.0 weight percent of the gum base.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Fats, oils, and softeners/emulsifiers may include tallow, hydrogenated tallow, hydrogenated and partially hydrogenated vegetable oils, cocoa butter, glycerol monostearate, glycerol triacetate (triacetin), lecithin, mono-, di- and triglycerides, acetylated monoglycerides, fatty acids (e.g. stearic, palmitic, oleic and linoleic acids), lanolin, diacetin, and combinations thereof. Hydrogenated vegetable oils are generally preferred, either alone or in combination with other softeners. Glycerol triacetate (also named triacetin) may also be preferred in combination with selected fats and oils, particularly the hydrogenated or partially hydrogenated vegetable oils. Particularly preferred softeners are hydrogenated or partially hydrogenated vegetable oils, glycerol monostearate, glycerol triacetate (triacetin) lecithin, and mixtures thereof.

Colorants and whiteners may include FD&C-type dyes and lakes, fruit and vegetable extracts, titanium dioxide, cocoa powder and combinations thereof.

The wax-free gum base of the invention may also contain optional ingredients such as antioxidants.

When the wax-free gum base of the invention is to be used in a regular (non-bubble) gum which has at least some adhesive (reduced tack) characteristics, the base should contain about 10 to about 40 weight percent of at least one synthetic elastomer, about 15 to about 30 weight percent of at least one elastomer plasticizer, about 5 to about 30 weight percent filler, about 15 to about 35 weight percent of at least one fat, oil, or softener, 0 to about 1 weight percent colorant and 0 to about 0.1 weight percent antioxidant. Specific embodiments of the wax-free gum base are provided in Examples 1–30 below.

TABLE 1

Wax-Free Gum Base

TABLE 1-continued

For Use In Chewing Gum Having
Some Reduced Tack Characteristics (Examples 1-30)

EXAMPLES 1-5

| GENERIC INGREDIENTS | IDENTIFICATION-EXAMPLE #: | | | | |
|---|---|---|---|---|---|
| | 1 | 2 | 3 | 4 | 5 |
| SYNTHETIC ELASTOMER | | | | | |
| STYRENE-BUTADIENE ELASTOMER | 5.3 | — | 2.1 | 1.3 | 1.8 |
| BUTYL (ISOPRENE-ISOBUTYLENE) ELASTOMER | 8.6 | 7.9 | 7.2 | 14.8 | — |
| POLYISOBUTYLENE ELASTOMER | 7.1 | — | 7.4 | 5.2 | 24.8 |
| POLYVINYL ACETATE | 10.5 | 27.2 | 15.3 | 12.1 | 10.1 |
| ELASTOMER PLASTICIZERS | | | | | |
| GLYCEROL ESTERS OF ROSIN | 2.1 | — | 19.0 | — | 3.7 |
| GLYCEROL ESTERS OF PART HYD ROSIN | 4.3 | 18.2 | — | 15.3 | 7.9 |
| TERPENE RESINS | 10.8 | — | — | — | 7.1 |
| FILLER | | | | | |
| CALCIUM CARBONATE | — | 15.9 | 20.7 | — | 17.7 |
| TALC | 25.5 | — | — | 16.7 | — |
| SOFTENER | | | | | |
| HYDROGENATED VEGETABLE OIL | 15.3 | 22.6 | 24.3 | 28.4 | 21.0 |
| GLYCEROL MONOSTEARATE | 8.2 | 7.4 | 4.0 | 5.1 | 3.5 |
| LECITHIN | 2.3 | 0.8 | — | 1.1 | 2.4 |
| TOTAL PERCENT | 100.0 | 100.0 | 100.0 | 100.0 | 100.0 |

EXAMPLES 6-10

| GENERIC INGREDIENTS | IDENTIFICATION-EXAMPLE #: | | | | |
|---|---|---|---|---|---|
| | 6 | 7 | 8 | 9 | 10 |
| SYNTHETIC ELASTOMER | | | | | |
| STYRENE-BUTADIENE ELASTOMER | — | — | — | 5.2 | 2.1 |
| BUTYL (ISOPRENE-ISOBUTYLENE) ELASTOMER | 8.1 | 14.6 | 9.4 | 4.1 | 7.2 |
| POLYISOBUTYLENE ELASTOMER | 3.6 | 1.2 | 13.0 | 5.9 | 7.3 |
| POLYVINYL ACETATE | 27.5 | 26.2 | 22.3 | 25.7 | 15.3 |
| ELASTOMER PLASTICIZERS | | | | | |
| GLYCEROL ESTERS OF ROSIN | — | 4.9 | — | 23.5 | 19.1 |
| GLYCEROL ESTERS OF PART HYD ROSIN | — | 12.6 | — | — | — |
| TERPENE RESINS | 27.1 | — | 10.0 | 3.2 | — |
| FILLER | | | | | |
| CALCIUM CARBONATE | 10.91 | — | 20.01 | 15.1 | 20.7 |
| TALC | — | 13.11 | — | — | — |
| SOFTENER | | | | | |
| HYDROGENATED VEGETABLE OIL | 14.3 | 16.6 | 20.7 | 12.2 | 24.3 |
| GLYCEROL MONOSTEARATE | 4.8 | 9.6 | 4.6 | 5.1 | 4.0 |
| LECITHIN | 3.71 | 1.2 | — | — | — |
| TOTAL PERCENT | 100.01 | 100.0 | 100.0 | 100.00 | 100.0 |

EXAMPLES 11-15

| GENERIC INGREDIENTS | IDENTIFICATION-EXAMPLE #: | | | | |
|---|---|---|---|---|---|
| | 11 | 12 | 13 | 14 | 15 |
| SYNTHETIC ELASTOMER | | | | | |
| STYRENE-BUTADIENE ELASTOMER | 4.3 | 5.9 | 3.9 | — | 2.1 |
| BUTYL (ISOPRENE-ISOBUTYLENE) ELASTOMER | 6.2 | 6.9 | 5.3 | 9.3 | 6.0 |
| POLYISOBUTYLENE ELASTOMER | 6.41 | 2.0 | 12.7 | 12.1 | 8.5 |
| POLYVINYL ACETATE | 21.81 | 24.8 | 14.9 | 21.4 | 15.3 |
| ELASTOMER PLASTICIZERS | | | | | |
| GLYCEROL ESTERS OF ROSIN | 2.6 | 8.6 | — | — | 10.1 |
| GLYCEROL ESTERS OF PART HYD ROSIN | — | 8.0 | — | — | 8.9 |
| TERPENE RESINS | 17.1 | 1.9 | 21.4 | 6.5 | — |
| FILLER | | | | | |
| CALCIUM CARBONATE | — | 9.9 | 13.7 | 21.4 | 20.9 |
| TALC | 14.6 | 7.2 | 1.4 | — | — |
| SOFTENER | | | | | |
| HYDROGENATED VEGETABLE OIL | 19.5 | 21.1 | 18.7 | 25.2 | 24.2 |
| GLYCEROL MONOSTEARATE | 4.4 | 3.7 | 5.7 | 4.1 | 4.0 |
| LECITHIN | 3.1 | — | 2.3 | — | — |

TABLE 1-continued

| | | | | | |
|---|---|---|---|---|---|
| TOTAL PERCENT | 100.0 | 100.0 | 100.0 | 100.0 | 100.0 |

EXAMPLES 16-20

| | IDENTIFICATION-EXAMPLE #: | | | | |
|---|---|---|---|---|---|
| GENERIC INGREDIENTS | 16 | 17 | 18 | 19 | 20 |
| SYNTHETIC ELASTOMER | | | | | |
| STYRENE-BUTADIENE ELASTOMER | 1.6 | — | 2.7 | — | — |
| BUTYL (ISOPRENE-ISOBUTYLENE) ELASTOMER | 3.7 | 8.1 | 2.3 | 8.9 | 3.6 |
| POLYISOBUTYLENE, ELASTOMER | 6.8 | 3.61 | 14.2 | 10.0 | 11.1 |
| POLYVINYL ACETATE | 22.3 | 27.31 | 17.31 | 21.3 | 21.9 |
| ELASTOMER PLASTICIZERS | | | | | |
| GLYCEROL ESTERS OF ROSIN | 9.9 | — | — | — | 19.6 |
| GLYCEROL ESTERS OF PART HYD ROSIN | 4.3 | — | 27.3 | — | 11.2 |
| TERPENE RESINS | 11.6 | 26.91 | — | 9.71 | 3.7 |
| FILLER | | | | | |
| CALCIUM CARBONATE | — | 11.3 | — | 21.5 | 6.4 |
| TALC | 17.2 | — | 8.2 | — | — |
| SOFTENER | | | | | |
| HYDROGENATED VEGETABLE OIL | 17.8 | 14.3 | 22.4 | 23.2 | 19.2 |
| GLYCEROL MONOSTEARATE | 4.8 | 4.8 | 2.7 | 5.4 | 3.3 |
| LECITHIN | — | 3.7 | 2.9 | — | — |
| TOTAL PERCENT | 100.0 | 100.0 | 100.0 | 100.0 | 100.0 |

EXAMPLES 21-25

| | IDENTIFICATION-EXAMPLE #: | | | | |
|---|---|---|---|---|---|
| GENERIC INGREDIENTS | 21 | 22 | 23 | 24 | 25 |
| SYNTHETIC ELASTOMER | | | | | |
| STYRENE-BUTADIENE ELASTOMER | — | 1.4 | 3.2 | — | 4.1 |
| BUTYL (ISOPRENE-ISOBUTYLENE) ELASTOMER | 7.4 | 8.4 | 7.3 | 8.8 | 11.3 |
| POLYISOBUTYLENE ELASTOMER | 1.9 | 1.6 | 7.5 | 3.5 | 7.9 |
| POLYVINYL ACETATE | 24.8 | 23.1 | 21.1 | 27.9 | 18.2 |
| ELASTOMER PLASTICIZERS | | | | | |
| GLYCEROL ESTERS OF ROSIN | — | 13.1 | 15.3 | — | — |
| GLYCEROL ESTERS OF PART HYD ROSIN | — | 22.1 | 2.4 | — | 26.2 |
| TERPENE RESINS | 25.8 | 3.6 | 5.81 | 27.4 | 1.4 |
| FILLER | | | | | |
| CALCIUM CARBONATE | 18.6 | — | — | 11.9 | 13.6 |
| TALC | | | | | |
| SOFTENER | — | 7.3 | 14.8 | — | — |
| HYDROGENATED VEGETABLE OIL | 12.3 | 11.3 | 19.8 | 12.3 | 8.2 |
| GLYCEROL MONOSTEARATE | 4.4 | 4.4 | 2.8 | 4.7 | 5.2 |
| LECITHIN | 4.8 | 3.7 | — | 3.5 | 3.9 |
| TOTAL PERCENT | 100.0 | 100.0 | 100.01 | 100.01 | 100.0 |

EXAMPLES 26-30

| | IDENTIFICATION-EXAMPLE #: | | | | |
|---|---|---|---|---|---|
| GENERIC INGREDIENTS | 26 | 27 | 28 | 29 | 30 |
| SYNTHETIC ELASTOMER | | | | | |
| STYRENE-BUTADIENE ELASTOMER | — | — | — | — | — |
| BUTYL (ISOPRENE-ISOBUTYLENE) ELASTOMER | 10.0 | 9.2 | 2.4 | 8.3 | 8.8 |
| POLYISOBUTYLENE ELASTOMER | 1.9 | 6.3 | 8.4 | 3.6 | 2.3 |
| POLYVINYL ACETATE | 27.6 | 13.1 | 20.5 | 27.5 | 27.4 |
| ELASTOMER PLASTICIZERS | | | | | |
| GLYCEROL ESTERS OF ROSIN | | | | | |
| GLYCEROL ESTERS OF PART HYD ROSIN | — | 19.9 | — | — | — |
| TERPENE RESINS | 25.31 | — | 23,51 | 25.3 | 28.3 |
| FILLER | | | | | |
| CALCIUM CARBONATE | 11.3 | 22.3 | — | 11.31 | 12.5 |
| TALC | — | — | 15.6 | — | — |
| SOFTENER | I | | | | |
| HYDROGENATED VEGETABLE OIL | 15.4 | 18.6 | 19.2 | 16.5 | 12.5 |
| GLYCEROL MONOSTEARATE | 4.8 | 10.6 | 8.9 | 4.8 | 4.7 |
| LECITHIN | 3.7 | — | 1.5 | 2.7 | 3.5 |

| TABLE 1-continued | | | | | |
|---|---|---|---|---|---|
| TOTAL PERCENT | 100.0 | 100.0 | 100.0 | 100.0 | 100.0 |

When the wax-free gum base of the invention is to be used in a regular (non-bubble) gum which does not have adhesive characteristics, the base should contain about 12 to about 30 weight percent natural elastomer, about 20 to about 40 weight percent synthetic elastomer, about 4 to about 25 weight percent elastomer plasticizer, about 5 to about 25 weight percent filler, about 15 to about 30 weight percent fats, oils, and softeners, 0 to about 1 weight percent colorant and 0 to about 0.1 weight percent antioxidant. Specific embodiments of the wax-free gum base fitting this description are provided in Examples 31–55 below:

TABLE 2

Wax-Free Gum Bases For Use In Chewing Gum Not Having Reduced Tack (Examples 31–55)

EXAMPLES 31–34

| GENERIC INGREDIENTS | IDENTIFICATION-EXAMPLE #: | | | |
|---|---|---|---|---|
| | 31 | 32 | 33 | 34 |
| NATURAL ELASTOMER | | | | |
| NATURAL GUM | 22.0 | 26.5 | 23.4 | 25.1 |
| SYNTHETIC ELASTOMER | | | | |
| STYRENE-BUTADIENE ELASTOMER | — | — | — | 1.9 |
| BUTYL (ISOPRENE-ISOBUTYLENE) ELASTOMER | 4.8 | 7.1 | 5.6 | 2.1 |
| POLYISOBUTYLENE ELASTOMER | 5.7 | 5.6 | 3.0 | 4.7 |
| POLYVINYL ACETATE | 16.4 | 18.7 | 19.8 | 24.8 |
| ELASTOMER PLASTICIZERS | | | | |
| GLYCEROL ESTERS OF ROSIN | 3.8 | — | — | 3.2 |
| GLYCEROL ESTERS OF PART HYD ROSIN | 12.3 | 15.3 | 15.9 | 12.6 |
| METHYL ESTERS OF ROSIN | — | — | — | 2.1 |
| TERPENE RESINS | | | | |
| FILLER | | | | |
| CALCIUM CARBONATE | — | 4.0 | 10.7 | 4.4 |
| TALC | 7.1 | — | — | — |
| SOFTENER | | | | |
| HYDROGENATED VEGETABLE OIL | 21.8 | 18.4 | 16.8 | 12.6 |
| GLYCEROL MONOSTEARATE | 6.1 | 4.4 | 4.8 | 3.8 |
| LECITHIN | — | — | — | 2.7 |
| TOTAL PERCENT | 100.0 | 100.0 | 100.0 | 100.0 |

EXAMPLES 35–38

| GENERIC INGREDIENTS | IDENTIFICATION-EXAMPLE #: | | | |
|---|---|---|---|---|
| | 35 | 36 | 37 | 38 |
| NATURAL ELASTOMER | | | | |
| NATIONAL GUM | 22.8 | 18.2 | 23.5 | 17.6 |
| SYNTHETIC ELASTOMER | | | | |
| STYRENE-BUTADIENE ELASTOMER | 2.6 | — | | |
| BUTYL (ISOPRENE-ISOBUTYLENE) ELASTOMER | 4.1 | 6.9 | 8.9 | 10.2 |
| POLYISOBUTYLENE ELASTOMER | 3.2 | 5.4 | 3.3 | 2.1 |
| POLYVINYL ACETATE | 16.3 | 15.2 | 12.9 | 26.9 |
| ELASTOMER PLASTICIZERS | | | | |
| GLYCEROL ESTERS OF ROSIN | 6.9 | — | 8.5 | 11.7 |
| GLYCEROL ESTERS OF PART HYD ROSIN | 11.8 | 12.5 | 5.5 | 4.8 |
| METHYL ESTERS OF ROSIN | 1.7 | 2.6 | 1.4 | — |
| TERPENE RESINS | — | — | 3.7 | — |
| FILLER | | | | |
| CALCIUM CARBONATE | 9.3 | 16.0 | — | — |
| TALC | — | — | 9.3 | 4.6 |
| SOFTENER | | | | |
| HYDROGENATED VEGETABLE OIL | 18.2 | 16.1 | 16.2 | 15.8 |
| GLYCEROL MONOSTEARATE | — | 7.1 | 5.7 | 6.3 |
| LECITHIN | 3.1 | — | 1.2 | — |
| TOTAL PERCENT | 100.0 | 100.0 | 100.0 | 100.0 |

EXAMPLES 39–42

| GENERIC INGREDIENTS | IDENTIFICATION-EXAMPLE #: | | | |
|---|---|---|---|---|
| | 39 | 40 | 41 | 42 |
| NATURAL ELASTOMER | | | | |
| NATURAL GUM | 12.9 | 18.5 | 15.7 | 22.6 |
| SYNTHETIC ELASTOMER | | | | |
| STYRENE-BUTADIENE ELASTOMER | — | — | 1.9 | — |
| BUTYL (ISOPRENE-ISOBUTYLENE) ELASTOMER | 9.1 | 6.4 | 3.7 | 5.8 |
| POLYISOBUTYLENE ELASTOMER | 9.4 | 5.2 | 4.1 | 3.1 |
| POLYVINYL ACETATE | 10.7 | 15.4 | 26.2 | 20.4 |

TABLE 2-continued

| ELASTOMER PLASTICIZERS | | | | |
|---|---|---|---|---|
| GLYCEROL ESTERS OF ROSIN | 15.2 | — | — | — |
| GLYCEROL ESTERS OF PART HYD ROSIN | — | 13.2 | 15.3 | 11.7 |
| METHYL ESTERS OF ROSIN | — | 2.0 | — | 4.0 |
| TERPENE RESINS | — | — | — | — |
| FILLER | | | | |
| CALCIUM CARBONATE | 20.6 | 18.5 | 12.2 | 11.6 |
| TALC | — | — | — | — |
| SOFTENER | | | | |
| HYDROGENATED VEGETABLE OIL | 15.8 | 13.9 | 15.1 | 17.5 |
| GLYCEROL MONOSTEARATE | 6.3 | 6.9 | 5.8 | 3.3 |
| LECITHIN | — | — | — | — |
| TOTAL PERCENT | 100.0 | 100.0 | 100.0 | 100.0 |

EXAMPLES 43–46

| GENERIC INGREDIENTS | IDENTIFICATION-EXAMPLE #: | | | |
|---|---|---|---|---|
|  | 43 | 44 | 45 | 46 |
| NATURAL ELASTOMER | 23.7 | 22.1 | 21.1 | 22.2 |
| NATURAL GUM | | | | |
| SYNTHETIC ELASTOMER | | | | |
| STYRENE-BUTADIENE ELASTOMER | — | — | — | — |
| BUTYL (ISOPRENE-ISOBUTYLENE) ELASTOMER | 6.2 | 5.7 | 6.1 | 5.7 |
| POLYISOBUTYLENE ELASTOMER | 5.9 | 3.1 | 2.8 | 3.1 |
| POLYVINYL ACETATE | 23.7 | 22.0 | 18.0 | 22.0 |
| ELASTOMER PLASTICIZERS | | | | |
| GLYCEROL ESTERS OF ROSIN | — | — | 15.7 | — |
| GLYCEROL ESTERS OF PART HYD ROSIN | 11.3 | 15.2 | — | 13.2 |
| METHYL ESTERS OF ROSIN | 2.9 | — | — | 2.0 |
| TERPENE RESINS | 2.8 | — | — | — |
| FILLER | | | | |
| CALCIUM CARBONATE | 5.6 | 11.4 | — | 11.3 |
| TALC | — | — | 15.4 | — |
| SOFTENER | | | | |
| HYDROGENATED VEGETABLE OIL | 12.1 | 17.2 | 15.1 | 17.2 |
| GLYCEROL MONOSTEARATE | 5.8 | 3.3 | 5.9 | 3.3 |
| LECITHIN | — | — | — | — |
| TOTAL PERCENT | 100.0 | 100.0 | 100.0 | 100.0 |

EXAMPLES 47–50

| GENERIC INGREDIENTS | IDENTIFICATION-EXAMPLE #: | | | |
|---|---|---|---|---|
|  | 47 | 48 | 49 | 50 |
| NATURAL ELASTOMER | 23.8 | 28.4 | 18.7 | 19.5 |
| NATURAL GUM | | | | |
| SYNTHETIC ELASTOMER | | | | |
| STYRENE-BUTADIENE ELASTOMER | — | — | — | |
| BUTYL (ISOPRENE-ISOBUTYLENE) ELASTOMER | 3.1 | 5.4 | 6.9 | 8.2 |
| POLYISOBUTYLENE ELASTOMER | 7.7 | 3.1 | 5.5 | 2.7 |
| POLYVINYL ACETATE | 20.5 | 26.6 | 14.8 | 17.2 |
| ELASTOMER PLASTICIZERS | | | | |
| GLYCEROL ESTERS OF ROSIN | — | — | — | 20.0 |
| GLYCEROL ESTERS OF PART HYD ROSIN | 10.4 | 11.4 | 15.5 | — |
| METHYL ESTERS OF ROSIN | 2.0 | — | — | — |
| TERPENE RESINS | 5.1 | — | — | — |
| FILLER | | | | |
| CALCIUM CARBONATE | — | 9.1 | 17.9 | 9.6 |
| TALC | 5.3 | — | — | — |
| SOFTENER | | | | |
| HYDROGENATED VEGETABLE OIL | 15.8 | 16.0 | 13.0 | 22.8 |
| GLYCEROL MONOSTEARATE | 6.3 | — | 7.7 | — |
| LECITHIN | — | — | — | — |
| TOTAL PERCENT | 100.0 | 100.0 | 100.0 | 100.0 |

EXAMPLES 51–55

| GENERIC INGREDIENTS | IDENTIFICATION-EXAMPLE #: | | | | |
|---|---|---|---|---|---|
|  | 51 | 52 | 53 | 54 | 55 |
| NATURAL ELASTOMER | 14.4 | 18.21 | 25.2 | 25.2 | 26.7 |
| NATURAL GUM | | | | | |
| SYNTHETIC ELASTOMER | | | | | |
| STYRENE-BUTADIENE ELASTOMER | — | — | — | — | — |
| BUTYL (ISOPRENE-ISOBUTYLENE) ELASTOMER | 9.1 | 6.8 | 2.4 | 3.5 | 3.2 |
| POLYISOBUTYLENE ELASTOMER | 3.6 | 5.4 | 4.9 | 5.7 | 6.1 |

TABLE 2-continued

| | | | | | |
|---|---|---|---|---|---|
| POLYVINYL ACETATE | 18.1 | 15.5 | 19.9 | 19.1 | 17.6 |
| ELASTOMER PLASTICIZERS | | | | | |
| GLYCEROL ESTERS OF ROSIN | 11.9 | — | 15.6 | — | — |
| GLYCEROL ESTERS OF PART HYD ROSIN | 13.0 | 12.7 | — | 15.6 | 15.6 |
| METHYL ESTERS OF ROSIN | — | 2.6 | — | — | — |
| TERPENE RESINS | — | — | 2.1 | 1.9 | — |
| FILLER | | | | | |
| CALCIUM CARBONATE | 14.1 | 15.7 | — | — | — |
| TALC | — | — | 7.1 | 6.2 | 8.0 |
| SOFTENER | | | | | |
| HYDROGENATED VEGETABLE OIL | 15.8 | 16.0 | 18.4 | 18.4 | 18.4 |
| GLYCEROL MONOSTEARATE | — | 7.1 | 4.4 | 4.4 | 2.8 |
| LECITHIN | — | — | — | — | 1.6 |
| TOTAL PERCENT | 100.0 | 100.0 | 100.0 | 100.0 | 100.0 |

When the wax-free gum base of the invention is to be used in a bubble gum, the base should contain about 30 to about 60 weight percent synthetic elastomer, about 5 to about 55 weight percent elastomer plasticizer, about 10 to about 35 weight percent filler, about 5 to about 25 weight percent fats, oils, emulsifiers, and other softeners, 0 to about 1 weight percent colorant and 0 to about 0.1 weight percent antioxidant. Specific embodiments of the wax-free base for use in bubble gum are provided in Examples 56-74 below.

TABLE 3

Wax-Free Gum Bases For Use In Bubble Gum

EXAMPLES 56-60

| GENERIC INGREDIENTS | IDENTIFICATION-EXAMPLE #: | | | | |
|---|---|---|---|---|---|
| | 56 | 57 | 58 | 59 | 60 |
| SYNTHETIC ELASTOMER | | | | | |
| POLYISOBUTYLENE ELASTOMER | 17.1 | 16.7 | 11.7 | 6.21 | 11.6 |
| POLYVINYL ACETATE | 24.9 | 25.6 | 29.4 | 30.9 | 31.5 |
| ELASTOMER PLASTICIZERS | | | | | |
| GLYCEROL ESTERS OF ROSIN | 6.8 | 8.0 | 10.7 | 14.6 | 19.8 |
| GLYCEROL ESTERS OF PART HYD ROSIN | — | — | — | — | — |
| FILLER | | | | | |
| CALCIUM CARBONATE | — | | | | |
| TALC | 34.7 | 34.9 | 34.1 | 34.0 | 21.9 |
| SOFTENER | | | | | |
| GLYCEROL TRIACETATE (TRIACETIN) | 4.6 | 3.9 | 4.4 | 4.7 | 5.0 |
| GLYCEROL MONOSTEARATE | 5.8 | 5.7 | 4.3 | 4.6 | 4.9 |
| ACETYLATED MONOGLYCERIDE | 6.1 | 5.2 | 5.4 | 5.0 | 5.3 |
| TOTAL PERCENT | 100.0 | 100.0 | 100.0 | 100.0 | 100.0 |

EXAMPLES 61-64

| GENERIC INGREDIENTS | IDENTIFICATION-EXAMPLE #: | | | |
|---|---|---|---|---|
| | 61 | 62 | 63 | 64 |
| SYNTHETIC ELASTOMER | | | | |
| POLYISOBUTYLENE ELASTOMER | 15.7 | 13.2 | 5.4 | 7.9 |
| POLYVINYL ACETATE | 32.11 | 33.2 1 | 34.8 1 | 34.2 |
| ELASTOMER PLASTICIZERS | | | | |
| GLYCEROL ESTERS OF ROSIN | 27.4 | 22.6 | 16.3 | 14.8 |
| GLYCEROL ESTERS OF PART HYD ROSIN | — | — | — | — |
| FILLER | | | | |
| CALCIUM CARBONATE | — | — | 30.2 | 29.8 |
| TALC | 10.1 | 17.3 | — | — |
| SOFTENER | | | | |
| GLYCEROL TRIACETATE (TRIACETIN) | 4.9 | 5.0 | 5.3 | 5.3 |
| GLYCEROL MONOSTEARATE | 4.7 | 4.1 | 5.9 | 5.0 |
| ACETYLATED MONOGLYCERIDE | 5.1 | 4.6 | 2.1 | 3.0 |
| TOTAL PERCENT | 100.01 | 100.0 | 100.0 | 100.0 |

EXAMPLES 65-69

| GENERIC INGREDIENTS | IDENTIFICATION-EXAMPLE #: | | | | |
|---|---|---|---|---|---|
| | 65 | 66 | 67 | 68 | 69 |
| SYNTHETIC ELASTOMER | | | | | |
| POLYISOBUTYLENE ELASTOMER | 17.21 | 13.01 | 11.61 | 11.61 | 7.9 |
| POLYVINYL ACETATE | 37.31 | 37.11 | 39.91 | 41.2 | 34.2 |
| ELASTOMER PLASTICIZERS | | | | | |
| GLYCEROL ESTERS OF ROSIN | 11.2 | — | — | | |
| GLYCEROL ESTERS OF PART | — | 19.8 | 19.9 | 19.4 | 14.8 |

TABLE 3-continued

| | | | | | |
|---|---|---|---|---|---|
| HYD ROSIN | | | | | |
| FILLER | | | | | |
| CALCIUM CARBONATE | 20.61 | 16.51 | 15.01 | — | 29.8 |
| TALC | — | — | — | 14.01 | — |
| SOFTENER | | | | | |
| GLYCEROL TRIACETATE | 5.6 | 5.6 | 6.0 | 6.2 | 5.3 |
| GLYCEROL MONOSTEARATE | 8.1 | 8.0 | 7.6 | 7.6 | 5.0 |
| ACETYLATED MONOGLYCERIDE | — | — | — | — | 3.0 |
| TOTAL PERCENT | 100.0 | 100.0 | 100.0 | 100.0 | 100.0 |

EXAMPLES 70—74

| | IDENTIFICATION-EXAMPLE #: | | | | |
|---|---|---|---|---|---|
| GENERIC INGREDIENTS | 70 | 71 | 72 | 73 | 74 |
| SYNTHETIC ELASTOMER | | | | | |
| POLYISOBUTYLENE | 11.6 | 10.9 | 11.6 | 12.4 | 11.9 |
| ELASTOMER | | | | | |
| POLYVINYL ACETATE | 37.8 | 37.5 | 31.4 | 31.0 | 37.0 |
| ELASTOMER PLASTICIZERS | | | | | |
| GLYCEROL ESTERS OF ROSIN | | | | | |
| GLYCEROL ESTERS OF PART | 19.8 | 20.6 | 19.8 | 21.1 | 20.3 |
| HYD ROSIN | | | | | |
| FILLER | | | | | |
| CALCIUM CARBONATE | — | — | — | — | — |
| TALC | 17.0 | 19.5 | 22.7 | 22.2 | 16.7 |
| SOFTENER | | | | | |
| GLYCEROL TRIACETATE | 5.6 | 5.2 | 5.8 | 4.3 | 5.7 |
| GLYCEROL MONOSTEARATE | 3.2 | 3.1 | 2.9 | 2.5 | 4.5 |
| ACETYLATED | 5.0 | 3.2 | 5.8 | 6.5 | 3.9 |
| MONOGLYCERIDE | | | | | |
| TOTAL PERCENT | 100.0 | 100.0 | 100.0 | 100.0 | 100.0 |

The wax-free gum base of the invention constitutes about 5–95 weight percent of the chewing gum, more typically 10–50 weight percent of the chewing gum, and most commonly 20–35 weight percent of the chewing gum. The gum base is typically prepared by adding an amount of the elastomer or mixture of elastomers, the elastomer plasticizers and filler to a heated sigma blade mixer with a front to rear blade speed ratio of typically 2:1. The initial amounts of ingredients are determined by the working capacity of the mixing kettle in order to attain a proper consistency. Similarly, different gum bases can be blended to achieve a final gum base to be used in the chewing gums of this invention. Both gum bases should be free of wax, if blended gum bases are used. After the initial ingredients have massed homogeneously, the balance of the elastomer plasticizer, filler, fats, oils and softeners, etc. are added in a sequential manner until a completely homogeneous molten mass is attained. This can usually be achieved in one to four hours, depending on the formulation. The final mass temperature can be between 60° C. and 150° C., more preferably between 80° C. and 120° C. The completed molten mass is emptied from the mixing kettle into coated or lined pans, extruded or cast into any desirable shape and allowed to cool and solidify.

Although the above method for making base is typical and applies to both chewing and bubble bases, it has been found that there is a preferred method for making the bubble bases described in this invention.

First, all of the polyvinyl acetate and portions of the polyisobutylene, or other elastomers, and filler are added and blended in a heated sigma blade mixer. Softeners, including fats and oils, and other softeners such as glycerol triacetate (triacetin) and/or acetylated monoglyceride are then added along with a second portion of each of polyisobutylene and filler. The acetylated monoglyceride or the triacetin, or both may be added at the end of the process if desired and still not alter the chewing texture of the gum made from the base.

Next, the rest of the polyisobutylene and filler are added along with the elastomer plasticizer. Finally, the remaining ingredients such as glycerol monostearate, any remaining fats and/or oils, emulsifiers and softeners, and antioxidants may be added. Colorant may be added at any time during the mixing process and is preferably added at the start.

There are some variations to the above described preferred method which in no way limits the method as described. Those skilled in the art of gum base manufacture may be able to appreciate any minor variations.

In producing wax-containing gum bases high in polyvinyl acetate, and particularly those high in high molecular weight polyvinyl acetate, it is necessary to improve blending of the ingredients by removing the heat applied to the sigma blade mixer at some point in the process. This reduces the temperature of the gum base and causes greater compatibility of its ingredients. In the inventive gum base process for making the inventive gum base free of wax, there is no need to remove the heat applied. The degree of incompatibility is greatly reduced since there is no wax present. Nevertheless, heat is preferably removed at about 30 minutes to about 90 minutes into the mixing time of the base production process.

In addition to the water-insoluble gum base, a typical chewing gum composition includes a watersoluble bulk portion and one or more flavoring agents. However, in this invention, the wax-free gum base of the invention is used in chewing gum compositions which contain from about 0.10 weight percent to about 2.0 weight percent moisture (free water). This is at least partially accomplished by using essentially dried water-soluble ingredients, which are referred to herein as essentially dried water-soluble sweeteners. These sweeteners can also include certain binders, certain bulking agents, certain sugars, sugar alcohols, dried and modified syrups and high-intensity sweeteners.

The water-soluble portion of the chewing gum may include softeners, bulk sweeteners, high-intensity sweeteners, binders, dried or modified, low water syrups, flavoring agents and combinations thereof. Softeners are added to the chewing gum in order to optimize the chewability and mouth feel of the gum. The softeners, which are also known as water-soluble plasticizers or plasticizing agents, generally constitute between about 0.5–15% by weight of the chewing gum. The softeners may include glycerin, triacetin, lecithin, glycerol monostearate, hydroxylated lecithin, agar, carrageenan, and combinations thereof. Aqueous sweetener solutions such as those containing sorbitol, hydrogenated starch hydrolyzates, corn syrup and combinations thereof, may also be used as softeners and binding agents in chewing gum. However, in our invention, the solutions, if used, are concentrated so as to contain at least 50 weight percent solids, preferably at least 70 weight percent solids, and most preferably the sweeteners, bulking agents, and binders are modified syrups with less than 10 weight percent water, or preferably from about 2.5 to about 7.5 weight percent water, or are solids, granulated or powdered, which solids contain less than 10 weight percent water (moisture) and preferably contain from 0.0 to 5.0 weight percent water.

A preferred binding agent is a product referred to as coevaporated Lycasin[1], a glycerin and/or propylene glygol modified hydrogenated starch hydrolyzate syrup containing about 7–8 weight percent water and about 65–70% hydrogenated starch hydrolyzate solids, the remainder being glycerin, propylene glycol, or mixtures thereof.

Bulk sweeteners constitute between 5–95% by weight of the chewing gum, more typically 20–80% by weight of the chewing gum and most commonly 30–60% by weight of the chewing gum. Bulk sweeteners may include both sugar and sugarless sweeteners and components, as long as these sugar and sugarless sweeteners and components contain moisture at the above levels and are used in the formulation of our wax-free chewing gums such that the total amount of moisture in the wax-free

[1]Lycasin is a trademark of the Roquette-Freres Company.

low moisture chewing gum is less than 2.0 weight percent, preferably from about 0.10 to about 2.0 weight percent water, based on the total weight of the chewing gum. Sugar sweeteners may include saccharide containing components including but not limited to sucrose, dextrose, maltose, dextrin, dried invert sugar, fructose, levulose, galactose, corn syrup solids, high maltose syrup, invert/high fructose syrup, maltotriose, glyceraldehyde, erytrose, xylose, lactose, leucrose, L-sugars, fructooligosaccharide and low calorie bulking agents such as indigestible dextrin, guard gum hydrolyzate, oligofructose, polydextrose, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolyzates, maltitol, lactitol, erythritol, cellobiitol, and the like, alone or in combination.

High-intensity sweeteners may also be present and are commonly used with sugarless sweeteners. When used, high-intensity sweeteners typically constitute between 0.001–5% by weight of the chewing gum, preferably between 0.01–1% by weight of the chewing gum. Typically, high-intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, stevia and the like, alone or in combination.

A preferred sugarless sweetener with particularly good binding properties in our invention is a coevaporated Lycasin. This material is manufactured by adding glycerin to a commercially available Hydrogenated Starch Hydrolyzate (HSH) Syrup, (Lycasin®, a product of the Roquette-Freres Company), followed by heating to sufficient temperature and for sufficient time to remove at least a reasonable portion of the water originally contained in the HSH product. The preferred coevaporated Lycasin product used as a sugarless sweetener/bulking agent/binder contains at least 20–30 weight percent glycerin and no more than from about 5.0 to about 10.0 weight percent water, preferably between about 7.0 to about 8.0 weight percent water, the reminder being hydrogenated starch hydrolyzate solids.

Most preferably, the coevaporated Lycasin contains from about 22 weight percent glycerin to about 28 weight percent glycerin. In the form predominantly used, the coevaporated Lycasin contains about 7.5 weight percent $H_2O$ and about 25 weight percent glycerin, the remainder being HSH solids.

Sweeteners and other active ingredients can be incorporated into chewing gum after being encapsulated in order to modify their release. The most common ways of modifying the release of the active ingredients include spray drying, spray chilling, fluid-bed covering, coacervation, absorption, extrusion encapsulation, and other standard encapsulating techniques. The active ingredient may be modified in a multiple step process comprising any of the processes noted. Encapsulating agents that can be used include polyvinyl acetate, acrylic polymers and copolymers, carboxyvinyl polymer, polyamides, polystyrene, polyvinyl pyrrolidone, natural waxes, zein, shellac, agar, alginates, a wide range of cellulose derivatives including ethyl cellulose, methyl cellulose, sodium hydroxymethyl cellulose, and hydroxypropylmethyl cellulose and sodium carboxymethyl cellulose, dextrin, gelatin, modified starches, acacia, maltodextrin, gum arabic, xanthan gum, relatin and pectin.

Combinations of sugar and/or sugarless sweeteners may be used in chewing gum. The sweetener may also function in the chewing gum in whole or in part as a water-soluble bulking agent. Additionally, the softener may also provide additional sweetness such as with aqueous sugar or alditol solutions.

Flavoring agents should generally be present in the chewing gum in an amount within the range of about 0.1–15% by weight of the chewing gum, preferably between about 0.2–5% by weight of the chewing gum, most preferably between about 0.5–3% by weight of the chewing gum. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

Optional ingredients such as colors, food acidulants, emulsifiers, pharmaceutical agents, vitamins, and additional flavoring agents may also be included in chewing gum.

One of the additional benefits of formulating the wax-free, low moisture chewing gums of this invention is the increased shelf life of the product, not only from the point of view of flexibility enhancement and the lack of brittleness development with time, but also from the point of view of high-intensity sweetener stability with time. Some high-intensity sweeteners such as sucralose, alitame, acesulfame K, aspartame, and the like undergo chemical reactions in the presence of water, which reactions degrade the sweetener molecules leading to a loss of sweetening capacity, or a lowered sucrose equivalent (S. E.).

By removing water, or by formulating our chewing gums using ingredients low in $H_2O$, such that the final wax-free chewing gum contains less than 2.0 weight percent water, preferably from 0.10 weight percent to 2.0 weight percent $H_2O$, the high-intensity sweeteners with demonstrated D. E. loss with time may be used more effectively, providing sweetness even over a long storage time.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets and cutting into sticks, extruding into chunks, or casting into pellets. Generally, the ingredients are mixed by first melting the gum base and adding it to the running mixer. The gum base may alternatively be melted in the mixer. Color and emulsifiers can be added at this time.

A softener such as glycerin, or the coevaporated glycasin, can be added next along with high solids corn syrup or corn syrup solids and part of the bulk portion. Further parts of the high solids bulk portion as well as additional softener may then be added to the mixer, if needed. Flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

The following formulas are illustrative of types of products which may be produced. All ingredient levels are expressed in weight percent.

Examples 75–96 illustrate non-tack, reduced-tack, and regular tack chewing gums of the present invention. As can be seen, there is much latitude in the selection of flavors, sweeteners and ingredient levels. Examples 75–90 describe sugarless gums. Encapsulated sweeteners are used to extend sweetness and flavor and to assist in protecting the artificial sweetener from degradation during storage. However, the use of encapsulated sweeteners may be less because the low moisture wax-free gums present a matrix which is more conducive to high-intensity sweetener stability. All of these examples illustrate the low moisture wax-free chewing gum products of this invention having moisture levels below 2%.

TABLE 4

Sugarless Non-Tack And Reduced Tack Gums With Low Moisture
EXAMPLES 75–79

| Example | 75 | 76 | 77 | 78 | 79 |
|---|---|---|---|---|---|
| Base Example # | 19 | 7 | 24 | 24 | 8 |
| Bass % | 27.11 | 21.21 | 29.48 | 22.50 | 18.11 |
| Flavor | 0.98 (Peppermint) | 0.97 (Spearmint Oil) | 1.15 (Peppermint Oil) | 1.47 (Cinnamon Flavor) | 1.00 (Wintergreen Oil) |
| Flavor | 0.20 (Spray Dried Menthol) | 0.16 (Peppermint Oil) | 0.21 (Spearmint Oil) | — | 0.27 (Peppermint Oil) |
| Sorbitol | 55.06 | 59.79 | 65.15 | 60.01 | 57.63 |
| Calcium Carbonate | — | 2.11 | — | 2.00 | 4.70 |
| Sorbitol Solution* | — | — | — | — | — |
| Coevaporated Lycasin** (7.5% water, 25% glycerin) | 9.18 | — | 8.11 | — | 8.88 |
| Glycerin | 4.11 | 12.11 | 3.11 | 11.61 | 7.10 |
| Mannitol | 3.10 | 3.11 | 2.66 | 2.00 | 2.00 |
| Encapsulated Aspartame | — | 0.26 | — | — | 0.21 |
| Free Aspartame | — | 0.10 | — | — | 0.10 |
| Encapsulated Alitame | 0.05 | — | 0.10 | — | — |
| Free Alitame | — | — | 0.03 | — | — |
| Encapsulated Sucralose | — | — | — | 0.21 | — |
| Free Sucralose | 0.08 | — | — | 0.02 | — |
| Lecithin | 0.15 | 0.20 | — | 0.10 | 0.10 |
| TOTAL | 100 | 100 | 100 | 100 | 100 |

*At least 70 weight percent Sorbitol.
**7.5% water, 25% glycerin, 67.6% HSH solids.

TABLE 5

Reduced And Regular Tack Low Calorie Gums
EXAMPLES 80–84

| Example | 80 | 81 | 82 | 83 | 84 |
|---|---|---|---|---|---|
| Base Example # | 3 | 19 | 13 | 52 | 44 |
| Base % | 24.7 | 19.2 | 24.0 | 19.2 | 19.2 |
| Sorbitol Solids | 6.0 | — | — | — | — |
| Mannitol Solids | 1.0 | — | — | — | — |
| Corn Syrup Solids | — | 6.0 | 24.6 | 18.6 | 8.0 |
| Sucrose | 10.0 | — | 10.0 | 10.0 | — |
| Lactose | — | 6.0 | — | — | 6.0 |
| Glycerin | 16.4 | 8.9 | 0.4 | 1.4 | 8.9 |
| Lecithin | 0.2 | — | — | — | — |
| Flavor | 1.4 | 0.9 | 1.0 | 0.9 | 0.9 |

TABLE 5-continued

Reduced And Regular Tack Low Calorie Gums EXAMPLES 80-84

| Example | 80 | 81 | 82 | 83 | 84 |
|---|---|---|---|---|---|
| Oligofructose | — | 50.0 | 60.0 | — | — |
| Fructooligosacchaide | — | — | — | 50.0 | 50.0 |
| Color | 0.05 | — | — | — | — |
| Aspartame | 0.25 | — | — | — | — |
| High Mol. Weight Indigestible Dextrin | — | — | — | — | — |
| Low Mol. Weight Indigestible Dextrin | 50.0 | — | — | — | — |
| Indigestible Dextrin Syrup | — | — | — | — | — |
| TOTAL | 100 | 100 | 100 | 100 | 100 |

Sorbitol Solids, Mannitol Solids, and Corn Syrup Solids, each contain less than 10 weight percent water.

Examples 85-90 are sugarless products made with the non-reduced-tack bases of the present invention. Examples 91-96 are equivalent sugar products.

TABLE 6

Regular Tack Sugarless Gums-Low Moisture EXAMPLES 85-90

| Example | 85 | 86 | 87 | 88 | 89 | 90 |
|---|---|---|---|---|---|---|
| Base Example # | 32 | 44 | 51 | 36 | 52 | 44 |
| Base % | 21.76 | 22.07 | 24.00 | 20.97 | 26.00 | 20.08 |
| Flavor | 0.92 (Peppermint Oil) | 0.77 (Spearmint Oil) | 0.83 (Spearmint Oil) | 0.99 (Cinnamon Flavor) | 0.97 (Peppermint Oil) | 1.04 (Peppermint Oil) |
| Flavor | — | 0.24 (Peppermint Oil) | — | — | — | 0.16 (Spray Dried Menthol) |
| Sorbitol | 46.64 | — | — | 63.61 | 51.50 | — |
| Coevaporated Lycasin (7.5% Water, 25% Glycerin) | 8.47 | 7.84 | 11.20 | 7.76 | — | — |
| Glycerin | 6.19 | 4.91 | 2.10 | 4.20 | 12.00 | — |
| Mannitol | 1.77 | — | — | 2.01 | 3.11 | — |
| Xylitol | 15.11 | — | 12.11 | — | 6.27 | 78.18 |
| Palatinit (Hydrogenated Isomaltulose) | — | 63.97 | 49.60 | — | — | — |
| Aspartame | — | — | — | 0.14 | — | 0.14 |
| Encapsulated Aspartame | — | — | — | 0.22 | — | 0.22 |
| Alitame | — | 0.02 | 0.02 | — | — | — |
| Encapsulated Alitame | — | 0.04 | 0.04 | — | — | — |
| Sucralose | 0.11 | — | — | — | 0.15 | — |
| Lecithin | 0.13 | 0.14 | 0.10 | 0.10 | — | 0.20 |
| TOTAL | 100 | 100 | 100 | 100 | 100 | 100 |

TABLE 7

Regular Tack Sugar Gums-Low Moisture EXAMPLES 91-96

| Example | 91 | 92 | 93 | 94 | 95 | 96 |
|---|---|---|---|---|---|---|
| Base Example # | 57 | 52 | 44 | 39 | 51 | 40 |
| Base % | 22.38 | 20.60 | 20.08 | 23.11 | 20.02 | 21.01 |
| Flavor | 0.89 (Peppermint Oil) | 0.58 (Spearmint Oil) | 0.86 (Peppermint Oil) | 0.91 (Peppermint Oil) | 1.21 (Fruit Flavor) | 0.98 (Wintergreen Flavor) |
| Flavor | — | — | — | 0.21 (Spearmint Oil) | — | 0.20 (Spray Dried Menthol) |
| Encapsulated Aspartame | — | — | — | 0.10 | — | — |
| Encapsulated Acesulfame K | — | — | — | — | 0.15 | — |
| Sucralose | — | — | — | — | — | 0.09 |
| Sugar | 58.39 | 59.49 | 62.88 | 59.97 | 63.59 | 62.51 |
| Corn Syrup Solids* | 17.20 | 18.60 | 16.40 | 14.70 | 13.88 | 14.19 |
| Glycerin | 1.09 | 0.83 | 1.00 | 1.00 | 1.05 | 1.02 |
| Lecithin | 0.05 | — | — | — | .10 | — |
| TOTAL | 100 | 100 | 100 | 100 | 100 | 100 |

*Corn Syrup Solids containing less than 10 weight percent water.

Examples 97-108 are examples of inventive coated pellet gums made with non-wax bases and essentially low water ingredients. The gum products of these examples are formed into pellets or balls for subsequent coating. Examples 97-102 are sugar pellets which could be coated with sugar syrups. Such syrups may contain modified starch (0 to 6.0%), compatible flavors and colors (0 to 0.30%), vegetable gums such as gum arabic and cellulose derivatives such as hydroxypropyl methyl cellulose (0 to 20%) in addition to sucrose or starch hydrolyzate in the form of coevaporated Lycasin.

Examples 103-108 are sugarless pellets which can be coated with sugar alcohol solutions such as those of sorbitol, xylitol and palatinit which are then dried. These syrups may also contain the same modifiers listed above for sugar syrups.

In both cases (sugar and sugarless) dry coating agent (sugar or sugar alcohol) may be added between layers of coating syrup, a process known as dry charging or soft panning.

Coating may be carried out by any suitable process, most often using a conventional pan, side vented pans, high capacity pans such as those made by Driam or Dumouline, or by continuous panning techniques.

TABLE 8

Sugar Pellet Gums For Coating EXAMPLES 97-102

| Example | 97 | 98 | 99 | 100 | 101 | 102 |
|---|---|---|---|---|---|---|
| Base Example # | 40 | 36 | 37 | 51 | 52 | 47 |
| Base % | 24.32 | 24.28 | 24.30 | 24.27 | 25.17 | 24.33 |
| Flavor | 0.66 (Spearmint Oil) | 0.73 (Peppermint Oil) | 2.66 (Licorice Powder) | 0.77 (Fruit Flavor) | 0.47 (Spearmint Oil) | 0.61 (Spearmint Oil) |
| Flavor | — | — | 0.60 (Menthol/Anathol) | — | 0.15 (Peppermint Oil) | — |
| Sugar | 52.97 | 52.87 | 50.94 | 52.86 | 52.59 | 52.84 |
| Coevaporated Lycasin | 22.16 | 22.12 | 21.60 | 22.11 | 21.62 | 22.22 |
| TOTAL | 100 | 100 | 100 | 100 | 100 | 100 |

TABLE 9

Sugarless Pellet Gums For Coating EXAMPLES 103-108

| Example | 103 | 104 | 105 | 108 | 107 | 108 |
|---|---|---|---|---|---|---|
| Base Example # | 33 | 26 | 40 | 29 | 36 | 35 |
| Base % | 31.01 | 33.00 | 32.71 | 33.03 | 30.97 | 31.45 |
| Flavor | 1.20 Spearmint Oil | 1.30 (Peppermint Oil) | 1.09 (Spearmint Oil) | 1.60 (Fruit Flavor) | 1.01 (Peppermint Oil) | 1.31 (Fruit Flavor) |
| Flavor | — | 0.50 (Menthol) | 0.17 (Peppermint Oil) | 0.50 (Lemon Flavor) | 0.21 (Spray Dried Menthol) | — |
| Sorbitol | 61.46 | 44.06 | 45.56 | 43.81 | 46.69 | 45.09 |
| Calcium Carbonate | 10.01 | 13.00 | 12.16 | 12.93 | 13.04 | 13.33 |
| Glycerin | 6.14 | 8.00 | 8.00 | 7.98 | 7.82 | 7.30 |
| Encapsulated Aspartame | 0.12 | 0.14 | 0.21 | 0.26 | 0.18 | 0.62 |
| Free Aspartame | 0.06 | — | 0.10 | — | 0.08 | — |
| TOTAL | 100 | 100 | 100 | 100 | 100 | 100 |

Inventive bubble gums may be prepared using the bubble gum bases of the present invention such as those listed in Examples 56-74. Illustrative formulations are given as Examples 109-119. Examples 109-113 are sugar bubble gum formulas. Note that Examples 110 and 113 use blends of two inventive bases. This is a technique to optimize processing and texture properties while minimizing the necessity of maintaining different bases for each product and without having additional custom bases compounded. Examples 114-119 are sugarless bubble gum formulas.

TABLE 10

Sugar Bubble Gums EXAMPLES 109-113

| Example | 109 | 110 | 111 | 112 | 113 |
|---|---|---|---|---|---|
| Base Example # | 69 | 72/74 | 72 | 59 | 72/69 |
| Base % | 24.02 | 11.00/11.00 | 20.01 | 20.0 | 9.00/13.00 |
| Flavor | 0.80 (Fruit Flavor) | 0.86 (Cream Soda) | 0.60 (Blueberry) | 0.60 (Strawberry) | 0.80 (Cream Soda) |
| Flavor | — | 0.03 (Vanilla) | — | — | 0.02 (Vanilla) |
| Sugar | 55.10 | 59.54 | 59.00 | 59.75 | 57.98 |
| Corn Syrup | 17.68 | 18.53 | 17.99 | 16.88 | 17.44 |

TABLE 10-continued

Sugar Bubble Gums
EXAMPLES 109-113

| Example | 109 | 110 | 111 | 112 | 113 |
|---|---|---|---|---|---|
| Solids* | | | | | |
| Lecithin | 0.00 | 0.36 | 0.51 | 0.60 | 0.45 |
| Glycerin | 1.74 | 0.70 | 0.81 | 1.49 | 1.31 |
| Color | 0.06 (Red) | — | 0.48 (Blue) | 0.08 (Red) | — |
| Citric Acid | — | — | 0.60 | 0.70 | — |
| TOTAL | 100 | 100 | 100 | 100 | 100 |

*Corn Syrup Solids containing less than 10 weight percent water.

TABLE 11

Sugarless Bubble Gums
EXAMPLES 114-119

| Example | 114 | 115 | 116 | 117 | 118 | 119 |
|---|---|---|---|---|---|---|
| Base Example # | 63 | 64 | 69 | 71 | 71 | 60 |
| Base % | 24.00 | 24.69 | 28.00 | 29.12 | 30.10 | 26.71 |
| Flavor | 1.20 (Fruit Flavor) | 1.41 (Fruit Flavor) | 1.71 (Grape Flavor) | 1.34 (Strawberry Flavor) | 1.11 (Lemon Flavor) | 1.23 (Peach Flavor) |
| Sorbitol | 51.47 | 51.88 | 46.03 | 49.66 | 46.39 | 49.33 |
| Calcium Carbonate | 6.00 | 4.31 | — | — | — | — |
| Talc | — | — | 3.71 | 3.44 | 1.99 | 3.44 |
| Lecithin | 1.00 | 0.91 | 0.84 | 0.61 | 0.86 | 0.75 |
| Citric Acid | — | — | — | 0.31 | 0.31 | — |
| Malic Acid | — | — | 0.21 | 0.11 | 0.31 | 0.16 |
| Tartaric Acid | — | — | 0.38 | 0.11 | — | — |
| Glycerin | 17.00 | 10.00 | 9.00 | 15.09 | 8.21 | 12.00 |
| Coevaporated Lycasin* | — | 6.79 | 9.61 | — | 10.41 | 6.00 |
| Color | 0.02 (Red) | 0.01 (Red) | 0.06 (Red/Blue) | 0.02 (Red) | 0.06 (Yellow) | 0.01 (Red) |
| Encapsulated Aspartame | 0.27 | — | 0.41 | — | — | 0.31 |
| Free Aspartame | 0.04 | — | 0.06 | — | 0.17 | 0.06 |
| Acesulfame K | — | — | — | 0.11 | — | — |
| Encapsulated Alitame | — | 0.10 | — | — | — | — |
| Sucralose | — | — | — | 0.09 | 0.09 | — |
| TOTAL | 100 | 100 | 100 | 100 | 100 | 100 |

*Coevaporated Lycasin containing 7.5 weight percent water and 25.0 weight percent glycerin.

While the embodiments of the invention disclosed herein are presently considered to be preferred, various modifications and improvements can be made without departing from the spirit and scope of the invention. The scope of the invention is indicated in the appended claims, and all changes that come within the meaning and range of equivalency of the claims are intended to be embraced therein.

We claim:

1. A substantially wax-free low moisture chewing gum containing from about 0.10 weight percent to about 2.0 weight percent water and comprising from about 10 to 90 weight percent of a wax-free gum base comprising:
   about 20 to about 60 weight percent of at least one synthetic elastomer;
   0 to about 30 weight percent of at least one natural elastomer;
   about 5 to about 55 weight percent of at least one elastomer plasticizer;
   about 4 to about 40 weight percent filler; and
   about 5 to about 40 weight percent of at least one fat, oil or softener; said chewing gum further comprising from about 0.001 to about 70 weight percent sweetener, and from about 0.01 to 10.0 weight percent flavoring agent.

2. The chewing gum of claim 1, wherein the gum base comprises elastomers selected from at least one of synthetic elastomers and natural elastomers selected from the group consisting of jelutong, lechi caspi, perillo, sorva, massaranduba balata, massaranduba chocolate, nispero, rosin dinha, chicle, gutta hang kang, smoked or liquid latex, guayule, chiquibul, crown gum, pendare, venezuelau chicle, leche de vaca, niger gutta, tunu, and chilte.

3. The chewing gum of claim 1 wherein the gum base comprises synthetic elastomers selected from the group consisting of polyisobutylene, butadiene-styrene copolymer, polyvinyl acetate, vinyl acetate-vinyl laurate copolymer, polyisoprene, isobutylene-isoprene copolymer, and combinations thereof.

4. The chewing gum of claim 1 comprising a gum base comprising synthetic elastomers selected from styrene-butadiene rubber, polyisobutylene, and butyl rubber, said elastomers being present, as total elastomer, as follows: Elastomer Weight %, as total elasastomer
   SBR about 1.0–20.0%
   PIB about 10.0–80.0%
   Butyl Rubber about 10.0–50.0%

5. The chewing gum of claim 1 wherein the elastomer plasticizer in the gum base is selected from the group consisting of glycerol esters of rosin, glycerol esters of partially hydrogenated rosin, glycerol esters of polymerized rosin, glycerol esters of partially dimerized rosin, partially hydrogenated methyl esters of rosin, glycerol esters of tall oil rosin, pentaerythritol esters of rosin, methyl esters of rosin, pentaerythritol esters of partially hydrogenated rosin, synthetic terpene resin, natural terpene resin, and combinations thereof.

6. The chewing gum of claim 1 wherein the filler in the gum base is selected from the group consisting of calcium carbonate, magnesium carbonate, talc, ground limestone, magnesium silicate, aluminum silicate, clay, alumina, titanium dioxide, mono-, di- and tri-calcium phosphates, cellulose, and combinations thereof.

7. The chewing gum of claim 1 wherein the softener in the gum base is selected from the group consisting of tallow, hydrogenated tallow, hydrogenated vegetable oils, partially hydrogenated vegetable oils, cocoa butter, glycerol monostearate, mono-, di- and triglycerides, acetylated monoglycerides, glycerol triacetate, lecithin, fatty acids, glycerol diacetate, lanolin, and combinations thereof.

8. The chewing gum of claim 1 comprising from about 20 to about 50 weight percent of a gum base comprising:
    about 25 to about 45 weight percent of at least one synthetic elastomer;
    about 10 to about 40 weight percent of at least one elastomer plasticizer;
    about 5 to about 30 weight percent filler; and
    about 15 to about 35 weight percent of at least one fat, oil, or softener.

9. The chewing gum of claim 1 comprising from about 20 to 50 weight percent of a gum base comprising:
    about 12 to about 30 weight percent of at least one natural elastomer;
    about 20 to about 40 weight percent of at least one synthetic elastomer;
    about 5 to about 25 weight percent of at least one elastomer plasticizer;
    about 4 to about 25 weight percent filler; and
    about 15 to about 30 weight percent of at least one fat, oil, or softener.

10. The chewing gum of claim 1 comprising a gum base comprising:
    about 30 to about 60 weight percent of at least one synthetic elastomer;
    about 5 to about 55 weight percent of at least one elastomer plasticizer;
    about 10 to about 35 weight percent filler; and
    about 5 to about 25 weight percent of at least one fat, oil, or softener.

11. A wax-free, low moisture bubble gum comprising the chewing gum base of claim 9, and further comprising 0.001 to 70.0 weight percent sweeteners, and from 0.01 to 10.0 weight percent flavoring agents.

12. A wax-free, low moisture chewing gum containing from about 0.10 to about 2.0 weight percent water, and having reduced tack properties, comprising:
    an essentially dried solids bulk portion, which bulk portion contains from 0.10 to 2.0 weight percent $H_2O$;
    one or more flavoring agents; and
    a water insoluble chewing gum base consisting primarily of about 25 to about 45 percent synthetic elastomer, about 10 to about 40 percent elastomer plasticizer, about 5 to about 30 percent filler, and about 15 to about 35 percent fats, oils, or softeners, by weight of the gum base.

13. The wax-free chewing gum of claim 12, wherein the synthetic elastomer is selected from the group consisting of sterene-butadiene copolymer, isoprene-isobutylene copolymer, polyisobutylene, polyvinyl acetate and combinations thereof.

14. The wax-free chewing gum of claim 12, wherein the elastomer plasticizer is selected from the group consisting of glycerol ester of wood rosin, glycerol ester of partially hydrogenated wood rosin, terpene resins and combinations thereof.

15. The wax-free chewing gum of claim 12, wherein the filler is selected from the group consisting of calcium carbonate, talc, and combinations thereof.

16. The wax-free chewing gum of claim 12, wherein the fats, oils, or softeners are selected from the group consisting of hydrogenated and partially hydrogenated vegetable oils, glycerol monostearate, glycerol triacetate, lecithin, and combinations thereof.

17. A wax-free, low moisture chewing gum containing from about 0.10 to about 2.0 weight percent water, comprising:
    an essentially dried water-soluble bulk portion;
    one or more flavoring agents; and
    a water insoluble chewing gum base consisting primarily of about 0 to about 30 percent natural elastomer, about 10 to about 50 percent synthetic elastomer, about 5 to about 25 percent elastomer plasticizer, about 4 to about 40 percent filler, and about 15 to about 40 percent of at least one fat, oil or softener, by weight of the chewing gum base.

18. The wax-free low moisture chewing gum of claim 17, wherein the natural elastomer is selected from the group consisting of jelutong, sorva, chicle, massaranduba balata, and combinations thereof.

19. The wax-free low moisture chewing gum of claim 17, wherein the synthetic elastomer is selected from the group consisting of styrene-butadiene elastomer, isoprene-isobutylene copolymer, poly-isobutylene, polyvinyl acetate, and combinations thereof.

20. The wax-free chewing gum of claim 17, wherein the elastomer plasticizer is selected from the group consisting of glycerol esters of partially hydrogenated rosin, methyl esters of rosin, glycerol esters of rosin, terpene resin, and combinations thereof.

21. The wax-free chewing gum of claim 17, wherein the filler is selected from the group consisting of calcium carbonate, talc, and combinations thereof.

22. The wax-free chewing gum of claim 17, wherein the softener is selected from the group consisting of hydrogenated and partially hydrogenated vegetable oils, glycerol monostearate, glycerol triacetate, lecithin, and combinations thereof.

23. A wax-free low moisture bubble gum, comprising:
    an essentially dried water-soluble bulk portion;
    one or more flavoring agents; and
    a water insoluble chewing gum base consisting primarily of about 30 to about 60 weight percent of at least one synthetic elastomer, about 5 to about 55 weight percent elastomer plasticizer, about 10 to about 35 weight percent filler, and about 5 to about 30 weight percent of at least one fat, oil or softener.

24. The wax-free low moisture bubble gum of claim 23, wherein the synthetic elastomer is selected from the group consisting of polyisobutylene, styrenebutadiene copolymers, butyl rubber, polyvinyl acetate, and combinations thereof.

25. The wax-free bubble gum of claim 23, wherein the elastomer plasticizer is selected from the group consisting of glycerol esters of partially hydrogenated rosin, glycerol esters of rosin, and combinations thereof.

26. The wax-free bubble gum of claim 23, wherein the filler is selected from the group consisting of calcium carbonate, talc, and combinations thereof.

27. The wax-free bubble gum of claim 23, wherein the fats, oils, or softeners are selected from the group consisting of hydrogenated and partially hydrogenated vegetable oils, glycerol monostearate, acetylated monoglyceride, glycerol triacetate, and combinations thereof.

28. A wax-free, low moisture chewing gum comprising gum base, flavor and low moisture sweetener; said gum base comprising:
about 20 to about 60 weight percent of at least one synthetic elastomer;
0 to about 30 weight percent of at least one natural elastomer;
about 5 to about 55 weight percent of at least one elastomer plasticizer;
about 4 to about 40 weight percent filler; and
about 5 to about 40 weight percent of at least one fat, oil, or softener, and further, wherein the low moisture sweetener contributes only from about 0.10 weight percent to about 2.0 weight percent water to the wax-free, low moisture chewing gum.

29. The chewing gum of claim 28 wherein the gum has reduced tack to dental surfaces.

30. The chewing gum of claim 28 wherein the gum is sugarless.

31. The chewing gum of claim 28 wherein the gum is in the form of a coated pellet or ball.

32. The chewing gum of claim 28 wherein the gum is a bubble gum.

33. The chewing gum of claim 28 wherein the low moisture sweetener is selected form sugar alcohols, high-intensity sweeteners, and mixtures thereof.

34. The chewing gum of claim 28 which further comprises from about 1.0 to about 50.0 weight percent, based on the total weight of the chewing gum, of co-evaporated Lycasin.

35. The chewing gum of claim 33 which further comprises from about 1.0 to about 50.0 weight percent, based on total weight of the chewing gum, of co-evaporated Lycasin.

36. The chewing gum of claim 33 wherein the synthetic elastomer is selected from the group consisting of styrene-butadiene copolymer, polyisobutylene, butyl rubber, polyvinylacetate, or mixtures thereof.

37. The chewing gum of claim 34 wherein the synthetic elastomer is selected from the group consisting of styrene-butadiene copolymer, polyisobutylene, butyl rubber, polyvinylacetate, or mixtures thereof.

38. The chewing gum of claim 35 wherein the synthetic elastomer is selected from the group consisting of styrene-butadiene copolymer, polyisobutylene, butyl rubber, polyvinylacetate, or mixtures thereof.

39. A wax-free, low moisture chewing gum comprising:

| Ingredient | Weight %, based on total weight |
|---|---|
| a) at least one wax-free gum base | about 10–90% |
| b) at least one essentially dried water-soluble sweetener | about 0.001–70% |
| c) at least one flavoring agent | about 0.01–10.0% | wherein the essentially dried water-soluble sweetener contributes only from about 0.10 to about 2.0 weight percent water to the chewing gum.

40. The chewing gum of claim 39 wherein at least one of the wax-free gum bases comprises:

| Ingredient | Weight % of gum base |
|---|---|
| synthetic elastomers | about 10–60% |
| natural elastomers | about 0–30% |
| elastomer plasticizers | about 5–55% |
| fillers | about 4–40% |
| fats, oils, softeners, emulsifiers | about 5–40% |
| hygroscopic agents | about 0–1% |

41. The chewing gum of claim 40 wherein the essentially dried water-soluble sweetener is selected from at least one sweetener from the group consisting of sugars, sugar alcohols, modified carbohydrate syrups, high-intensity sweeteners, and mixtures thereof.

42. The chewing gum of claim 41 wherein at least one sweetener comprises glycerin coevaporated hydrogenated starch hydrolyzate comprising from 20–30 weight percent glycerin, 5–10 weight percent water, and from 60–75 weight percent hydrogenated starch hydrolyzate solids.

43. The chewing gum of claim 40 wherein the synthetic elastomer is selected from the group consisting of styrene-butadiene copolymer, polyisobutylene, butyl rubber, polyvinylacetate, or mixtures thereof.

44. The chewing gum of claim 40 wherein the fats, oils, softeners, and emulsifiers are selected from at least one of the group consisting of hydrogenated and partially hydrogenated vegetable oils, glycerol monostearate, acetylated monoglycerides, glycerol diacetate, and glycerol triacetate.

45. The chewing gum of claim 40 wherein the elastomer plasticizer is selected from at least one of glycerol esters of partially hydrogenated rosin, glycerol esters of rosin, terpene resins, and mixtures thereof.

* * * * *

UNITED STATES PATENT AND TRADEMARK OFFICE
CERTIFICATE OF CORRECTION

PATENT NO. : 5,437,875
DATED : August 1, 1995
INVENTOR(S) : Steven P. Synosky et al.     Page 1 of 2

It is certified that error appears in the above-indentified patent and that said Letters Patent is hereby corrected as shown below:

On the Title Page

On Page 2, in column 1, line 45, under "U.S. PATENT DOCUMENTS", delete the following:

"5,039,530     8/1991     Yatka jet al.     426/3"

and substitute the following:

--5,039,530     8/1991     Yatka et al.     426/3--.

In claim 4, lines 5-8 (column 26, lines 65-68), delete "as follows:  Elastomer Weight %, as total elasastomer
SBR about 1.0-20.0%
PIB about 10.0-80.0%
Butyl Rubber about 10.0-50.0%"

and substitute the following:

--as follows:

| Elastomer | Weight %, as total elastomer |
|---|---|
| SBR | about 1.0 - 20.0% |
| PIB | about 10.0 - 80.0% |
| Butyl Rubber | about 10.0 - 50.0%--. |

UNITED STATES PATENT AND TRADEMARK OFFICE
CERTIFICATE OF CORRECTION

PATENT NO.   : 5,437,875
DATED        : August 1, 1995
INVENTOR(S)  : Steven P. Synosky et al.

It is certified that error appears in the above-indentified patent and that said Letters Patent is hereby corrected as shown below:

Col. 27
    In claim 5, line 7, delete "tall" and substitute --tal--.
    Col. 29
    In claim 33, line 2, delete "form" and substitute --from--.

Signed and Sealed this

Nineteenth Day of November, 1996

BRUCE LEHMAN

*Commissioner of Patents and Trademarks*